United States Patent
Hwang et al.

(10) Patent No.: US 8,724,578 B2
(45) Date of Patent: May 13, 2014

(54) APPARATUS AND METHOD FOR DISTRIBUTED SCHEDULING IN WIRELESS COMMUNICATION SYSTEM

(75) Inventors: Pil-Yong Hwang, Gimpo-si (KR); Yung-Soo Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 136 days.

(21) Appl. No.: 13/541,060

(22) Filed: Jul. 3, 2012

(65) Prior Publication Data

US 2013/0010717 A1   Jan. 10, 2013

(30) Foreign Application Priority Data

Jul. 6, 2011 (KR) .......................... 10-2011-0067005

(51) Int. Cl.
*H04Q 7/00* (2006.01)
*H04B 7/212* (2006.01)

(52) U.S. Cl.
USPC .......................................... 370/329; 370/444

(58) Field of Classification Search
USPC ......... 370/328, 329, 338, 437, 443–445, 447, 370/448, 461, 462
See application file for complete search history.

(56) References Cited

U.S. PATENT DOCUMENTS

| | | | | |
|---|---|---|---|---|
| 2004/0085993 | A1* | 5/2004 | Wentink | 370/447 |
| 2006/0221823 | A1* | 10/2006 | Shoham et al. | 370/229 |
| 2007/0053322 | A1* | 3/2007 | Park et al. | 370/329 |
| 2008/0063106 | A1 | 3/2008 | Hahm et al. | |
| 2010/0074193 | A1* | 3/2010 | Chaponniere | 370/329 |
| 2010/0290352 | A1 | 11/2010 | Oyman et al. | |

FOREIGN PATENT DOCUMENTS

KR   10-0679320 B1   2/2007

\* cited by examiner

*Primary Examiner* — Hong Cho
(74) *Attorney, Agent, or Firm* — Jefferson IP Law, LLP

(57) ABSTRACT

An apparatus and a method for transmitting data according to distributed scheduling by guaranteeing fairness and considering system throughput at same time in a wireless communication system are provided. The method for operations of a terminal for transmitting the data include determining a Proportional Fairness (PF) value, determining a link class of a link to a peer terminal using the PF value, determining a variable which is used to determine whether the terminal wins or loses a contention according to the link class, and transmitting a request message requesting channel occupation based on the contention according to the variable.

28 Claims, 6 Drawing Sheets

APPARATUS AND METHOD FOR DISTRIBUTED SCHEDULING IN WIRELESS COMMUNICATION SYSTEM

PRIORITY

This application claims the benefit under 35 U.S.C. §119(a) of a Korean patent application filed in the Korean Intellectual Property Office on Jul. 6, 2011 and assigned Serial No. 10-2011-0067005, the entire disclosure of which is hereby incorporated by reference.

BACKGROUND OF THE INVENTION

1. Field of the Invention

The present invention relates to a wireless communication system.

2. Description of the Related Art

Scheduling schemes used in a wireless communication system include centralized scheduling schemes and distributed scheduling schemes. In a centralized scheduling scheme, one control node such as a base station schedules radio resources of other nodes. In a distributed scheduling scheme, each node randomly selects its radio resource. The distributed scheduling scheme mostly adopts a contention-based method, and a plurality of distributed nodes fundamentally occupies the radio resources through adequate contention. An example of a well-known distributed scheduling scheme includes a Carrier Sense Multiple Access (CSMA)/Collision Avoidance (CA) scheme.

Fairness and maximum system throughput are major criteria of the scheduling. The fairness reflects how fairly each node occupies the resource, and the maximum system throughput reflects how efficiently the whole system is utilized.

There is trade-off between the fairness and the maximum system throughput. Accordingly, when the maximum system throughput is focused more, the fairness between the nodes is not ensured to thus cause resource starving of a particular node. Conversely, when the fairness is focused more, each node fairly occupies the resource but the whole system throughput can be degraded. Hence, it is necessary to fulfill the effective distributed scheduling by considering both of the fairness and the maximum system throughput.

Therefore, a need exists for an apparatus and a method for distributed scheduling by guaranteeing fairness and considering system throughput at same time in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for distributed scheduling by guaranteeing fairness and considering system throughput at same time in a wireless communication system.

Another aspect of the present invention is to provide an apparatus and a method for giving an advantageous position in contention according to a Proportional Fairness (PF) value in a wireless communication system.

Yet another aspect of the present invention is to provide an apparatus and a method for giving an advantageous position in contention according to a link class determined by a PF value in a wireless communication system.

In accordance with an aspect of the present invention, an operating method of a terminal for transmitting data according to distributed scheduling in a wireless communication system is provided. The method includes determining a Proportional Fairness (PF) value, determining a link class of a link to a peer terminal using the PF value, determining a variable which is used to determine whether the terminal wins or loses a contention according to the link class, and transmitting a request message requesting channel occupation based on the contention according to the variable.

In accordance with another aspect of the present invention, an operating method of a terminal for receiving data according to distributed scheduling in a wireless communication system is provided. The method includes receiving a request message requesting channel occupation from a peer terminal, when the request message comprises a PF value of the peer terminal, transmitting a response message comprising the PF value and channel information of the peer terminal, and when the request message does not comprise the PF value of the peer terminal, transmitting a response message comprising the channel information of the peer terminal.

In accordance with yet another aspect of the present invention, an apparatus of a terminal for transmitting data according to distributed scheduling in a wireless communication system is provided. The apparatus includes a controller for determining a PF value, for determining a link class of a link to a peer terminal using the PF value, and for determining a variable which is used to determine whether the terminal wins or loses a contention according to the link class, and a modem for transmitting the request message requesting channel occupation based on the contention according to the variable.

In accordance with still another aspect of the present invention, an apparatus of a terminal for receiving data according to distributed scheduling in a wireless communication system is provided. The apparatus includes a modem for receiving a request message requesting channel occupation from a peer terminal, and for transmitting a response message corresponding to the request message, and a controller for, when the request message comprises a PF value of the peer terminal, generating a response message comprising the PF value and channel information of the peer terminal, and when the request message does not comprise the PF value of the peer terminal, generating a response message comprising the channel information of the peer terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
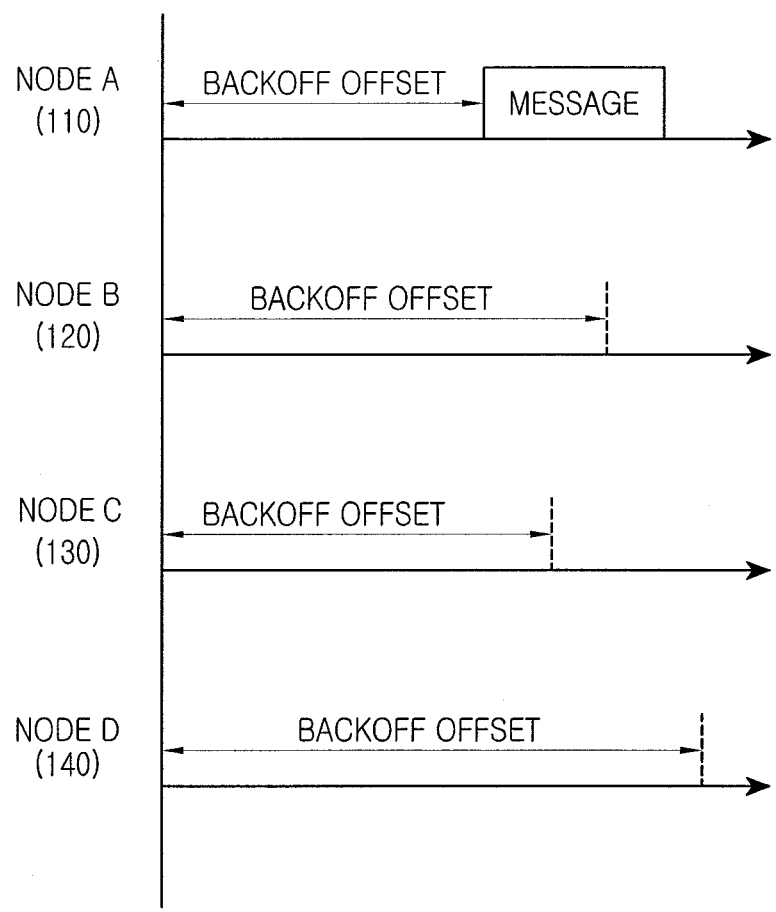
FIG. 1 illustrates contention results based on a backoff offset in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to an apparatus and a method for distributed scheduling in a wireless communication system. Exemplary embodiments of the present invention provide a technique for distributed scheduling by ensuring fairness and by considering system throughput at the same time in a wireless communication system.

The distributed scheduling according to exemplary embodiments of the present invention is based on contention. Accordingly, nodes participate in the contention according to a defined procedure, and the node winning in the contention occupies a channel. In so doing, each node calculates a Proportional Fairness (PF) value reflecting the fairness of the channel occupation and reflects the PF value in the contention. That is, exemplary embodiments of the present invention provide an algorithm which gives advantage as the PF value increases. Herein, the PF value is determined using queue status, channel quality, previous data amount transmitted, and Quality of Service (QoS) of traffic. As the PF value is greater, the channel occupation is needed more. The fairness is ensured only when the node of the greater PF value first occupies the channel.

Based on the contention procedure, win or loss of the contention is determined variously.

As an example, according to exemplary embodiments of the present invention, a backoff offset can be used. The contention using the backoff offset is shown in FIG. 1.

FIG. 1 depicts contention results based on the backoff offset in a wireless communication system according to an exemplary embodiment of the present invention.

Referring to FIG. 1, nodes 110 through 140 (e.g., denoted by node A, node B, node C, and node D) set their own backoff offset and send a message requesting the channel occupation after the time of the backoff offset passes by. The node A 110 first sending the message wins in the contention. Hence, the smaller backoff offset used by a particular node, the more advantageous the particular node is in the contention, as shown in FIG. 1.

As an example, according to exemplary embodiments of the present invention, a transmission location of the message requesting the channel occupation can be used. An example of the contention using the transmission location is shown in FIG. 2.

Figure 2:
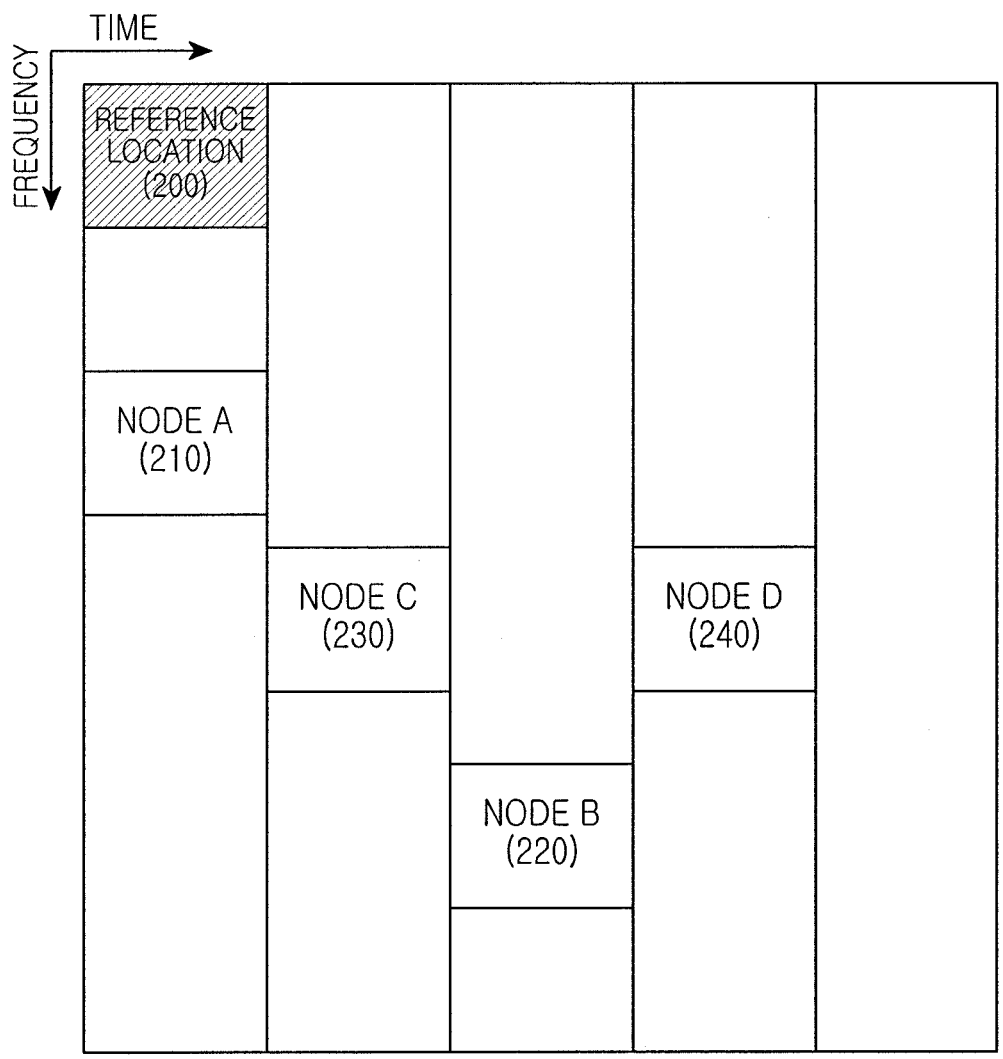
FIG. 2 illustrates contention results based on a resource location in a wireless communication system according to an exemplary embodiment of the present invention.

FIG. 2 depicts contention results based on a resource location in a wireless communication system according to an exemplary embodiment of the present invention.

Referring to FIG. 2, nodes 210 through 240 (e.g., denoted by node A, node B, node C, and node D) determine the resource location for sending the message within one unit resource region and transmit the message over the resource of the determined location. In so doing, the node A 210 sending the message over the resource closest to a predefined reference location 200 wins in the contention. Hence, it is advantageous in the contention for the determined location to be closer to the reference location 200, as shown in FIG. 2.

Thus, exemplary embodiments of the present invention provide an algorithm which decreases the backoff offset as the PF value increases, or which moves the resource location for sending the message toward the particular location as the PF value increases. The contentions of FIGS. 1 and 2 are exemplary, and exemplary embodiments of the present invention are equally applicable to the scheduling based on other contention schemes. Hereafter, to ease the understanding, a variable directly related to the win or the loss of the contention, such as backoff offset and resource location for sending the message, that is, a variable for determining the win or the loss of the contention is referred to as a contention metric.

Characteristics of the distributed scheduling according to an exemplary embodiment of the present invention are described in brief First, the node wishing to transmit data obtains channel information from a peer node. Herein, the channel information can be determined, for example, through measurement over a relatively long term. The channel information should be obtained before the data is transmitted, and is used to determine the link status. For example, the link status can be defined as shown in Table 1.

TABLE 1

| Status | Description |
| --- | --- |
| Candidate | Before acquiring channel information relating to a link of a peer node |
| Ready | After acquiring channel information relating to a link of a peer node |

According to exemplary embodiments of the present invention, the link is initialized in the candidate status, and is switched to the ready status by acquiring the channel information relating to the link of the peer node. As an example, the channel information can include at least one of a channel quality and a channel value. The channel information can vary with time. Accordingly, after the transition to the ready status, when the channel information is not updated by re-acquiring the channel information over a certain time, the link returns to the candidate status according to the link expiration.

Secondly, the node wishing to transmit data compares the PF values of its link and the current link, and determines its link class for the contention of the next slot according to the comparison result. According to exemplary embodiments of the present invention, the link class is determined by a difference between the PF value of the link occupying the previous channel and the PF value of the link of the node. Each link class corresponds to a weight for adjusting the contention metric. The weight includes at least one value. For example, the link class can be defined as shown in Table 2.

TABLE 2

| Link Class | PF difference value | Weight |
|---|---|---|
| A | Large (greater than th_a) | 0 |
| B | Medium (less than th_a and greater or equal to th_b) | K |
| C | Small (less than th_b and greater or equal to th_c) | 2K |
| D | Very small (less than th_c) | 3K |

Thirdly, in the contention of the next slot, the node determines the contention metric for the contention by reflecting the weight corresponding to its link class. For example, when the contention metric is the backoff offset, the node adds the value corresponding to its link class to the backoff offset. For example, when the contention metric is the resource location, the node moves the resource location as much as the value corresponding to its link.

Fourthly, each node participates in the contention using a message requesting the channel occupation and a message responding to the channel occupation request, and exchanges necessary information. Hereafter, to ease the understanding, the message requesting the channel occupation is referred to as a request message, and the message responding to the channel occupation request is referred to as a response message. More specifically, the request message can be called Request To Send (RTS), and the response message can be called Clear To Send (CTS). As an example, the request message is used for the contention to occupy the channel and to inform neighboring nodes of the PF value. As an example, the response message is used to deliver the channel information to the peer node and to inform the neighboring nodes of the PF value of the peer node.

Now, the data transmission based on the distributed scheduling having the characteristics as stated above is explained in detail.

Figure 3:
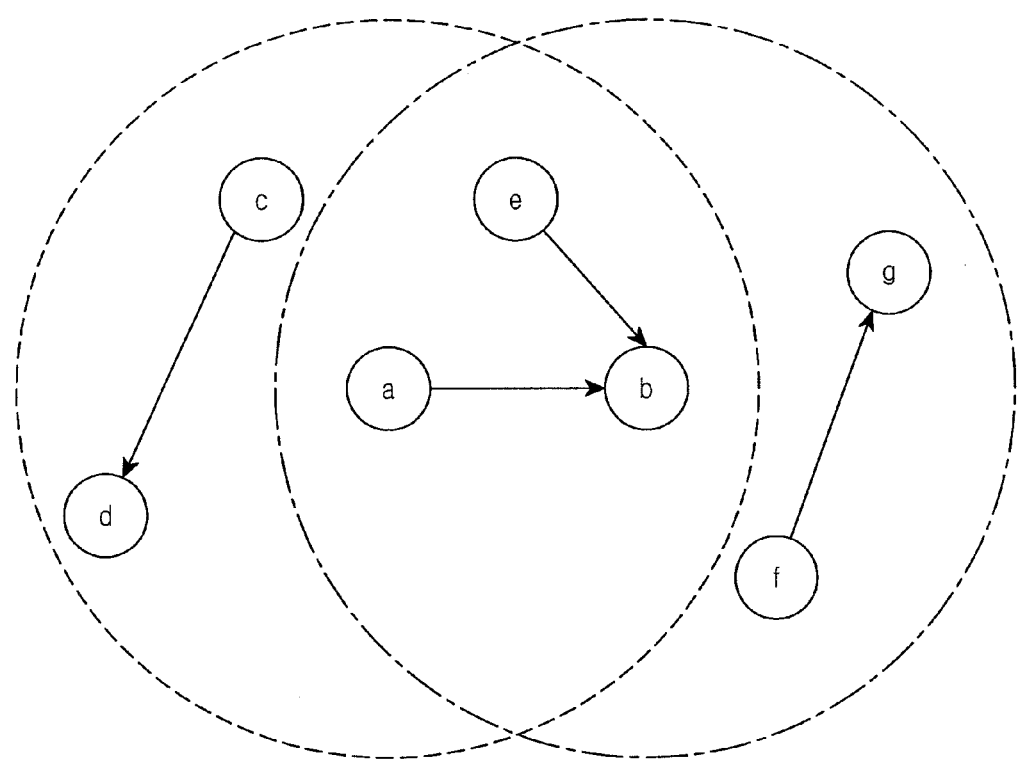
FIG. 3 illustrates distribution of nodes in a wireless communication system according to an exemplary embodiment of the present invention.

FIG. 3 depicts node distribution in a wireless communication system according to an exemplary embodiment of the present invention.

Referring to FIG. 3, there are seven nodes (e.g., denoted by reference letters a-g). As illustrated in FIG. 3, the node c wants to transmit data to the node d, the node a wants to transmit data to the node b, the node e wants to transmit data to the node b, and the node f wants to transmit data to the node g. Hence, the transmitter nodes c, a, e and f participate in the contention for transmitting the request message. In so doing, the status, a channel information valid period, the PF value, the PF difference value, and the link class of the links are shown in Table 3.

TABLE 3

| Link | Status | channel information valid period | PF value | PF difference value | Link Class |
|---|---|---|---|---|---|
| a-b | Candidate | — | — | — | A |
| c-d | Candidate | — | — | — | A |
| e-b | Candidate | — | — | — | A |
| f-g | Candidate | — | — | — | A |

As shown in Table 3, all of the links are initialized in the candidate status. Since there is no link occupying the previous channel, the PF difference value is absent. The link class is set to an initial value A of the candidate status. The channel information valid period indicates the time for which the ready status of the link is maintained without updating after the channel information is obtained, and reduces every time one slot passes.

It is assumed that the node a wins in the contention; that is, the node a successfully occupies the channel. As the node a wins in the contention, the request message of the node a is delivered to the node b. The node b receiving the request message sends a response message including the channel information of the link a-b. At this time, the status, the channel information valid period, the PF value, the PF difference value, and the link class of the links are shown in Table 4.

TABLE 4

| Link | Status | channel information valid period | PF value | PF difference value | Link Class |
|---|---|---|---|---|---|
| a-b | Ready | 10 | — | — | C |
| c-d | Candidate | — | — | — | A |
| e-b | Candidate | — | — | — | A |
| f-g | Candidate | — | — | — | A |

As shown in Table 4, the link a-b switches to the ready status according to the channel information acquisition. The link class of the link a-b is changed to an initial value C of the ready status.

Because the link class of the link a-b is changed to C, the node a is at a disadvantage in the contention. Naturally, the node c, the node e, and the node f are highly likely to win in the contention. For example, the node of the link in the candidate status is more advantageous than the node of the ready status in the contention. Hence, the links sequentially enter the ready status in every slot. As a result, all of the links enter the ready status. In addition, the PF value of the link is determined per slot. In so doing, because the PF value is affected by an accumulated data size, latency, and data QoS of a buffer, the class of each link can change. In the above exemplary embodiment of the present invention, the link class is not changed because the node knows its PF value but does not have the PF value of the current link. At this time, the status, the channel information valid period, the PF value, the PF difference value, and the link class of the links are shown in Table 5.

TABLE 5

| Link | Status | channel information valid period | PF value | PF difference value | Link Class |
|------|--------|----------------------------------|----------|---------------------|------------|
| a-b  | Ready  | 7  | — | — | C |
| c-d  | Ready  | 8  | — | — | C |
| e-b  | Ready  | 9  | — | — | C |
| f-g  | Ready  | 10 | — | — | C |

Next, the node a, the node c, the node e, and the node f determine their respective link PF values and then participate in the contention for transmitting the request message. Because each link is in the ready status, the request message includes the PF value. At this time, the status, the channel information valid period, the PF value, the PF difference value, and the link class of the links are shown in Table 6.

TABLE 6

| Link | Status | channel information valid period | PF value | PF difference value | Link Class |
|------|--------|----------------------------------|----------|---------------------|------------|
| a-b  | Ready  | 7  | 22 | — | C |
| c-d  | Ready  | 8  | 25 | — | C |
| e-b  | Ready  | 9  | 19 | — | C |
| f-g  | Ready  | 10 | 8  | — | C |

The PF values in Table 6 are hypothetical for the understanding. According to exemplary embodiments of the present invention, the PF value can be determined based on the queue status, the channel quality, the previous data amount transmitted, and the QoS of the traffic.

It is assumed that the node a wins in the contention. As the node a wins in the contention, the request message of the node a is delivered to the node b. The node b receiving the request message sends a response message including the PF value of the link a-b and the channel information. The node a receives the channel information through the response message and updates the channel information. The PF value of the links is re-determined. In detail, the PF value decreases in the link a-b winning in the contention, and increases in the other links lossed in the contention. By means of the request message transmitted by the node a and the response message transmitted by the node b, the node c, the node d, the node e, the node f, and the node g get to know the PF value of the link a-b. Hence, the PF difference value of the links can be determined. At this time, the status, the channel information valid period, the PF value, the PF difference value, and the link class of the links are shown in Table 7.

TABLE 7

| Link | Status | channel information valid period | PF value | PF difference value | Link Class |
|------|--------|----------------------------------|----------|---------------------|------------|
| a-b  | Ready  | 10 | 12 | −10 (=12 − 22) | D |
| c-d  | Ready  | 7  | 35 | 13 (=35 − 22)  | B |
| e-b  | Ready  | 8  | 29 | 7 (=29 − 22)   | C |
| f-g  | Ready  | 9  | 18 | −4 (=18 − 22)  | D |

As shown in FIG. 7, the PF difference value is determined based on the PF value when the link a-b occupies the channel. As the PF difference value is determined, the link class of the links is determined. As the channel information of the node a-b is updated, the channel information valid period of the link a-b is initialized.

Similarly, the node a, the node c, the node e, and the node f repeat the contention. The node winning in the contention transmits data and updates the channel information. When one node is continuously lossed in the contention, the channel information expires and the link returns to the candidate status. For example, when the node d is continuously lossed in the contention, the status, the channel information valid period, the PF value, the PF difference value, and the link class of the links are shown in Table 8.

TABLE 8

| Link | Status | channel information valid period | PF value | PF difference value | Link Class |
|------|--------|----------------------------------|----------|---------------------|------------|
| a-b  | Ready     | 8 | 14 | −10 | D |
| c-d  | Ready     | 3 | 32 | 31  | A |
| e-b  | Candidate | — | 35 | 30  | A |
| f-g  | Ready     | 6 | 23 | 18  | B |

Hereafter, operations and structure of the node for the distributed scheduling are elucidated by referring to the drawings. For convenience, the node is referred to as a terminal FIG. 4 illustrates operations of a terminal for transmitting data in a wireless communication system according to an exemplary embodiment of the present invention.

Figure 4:
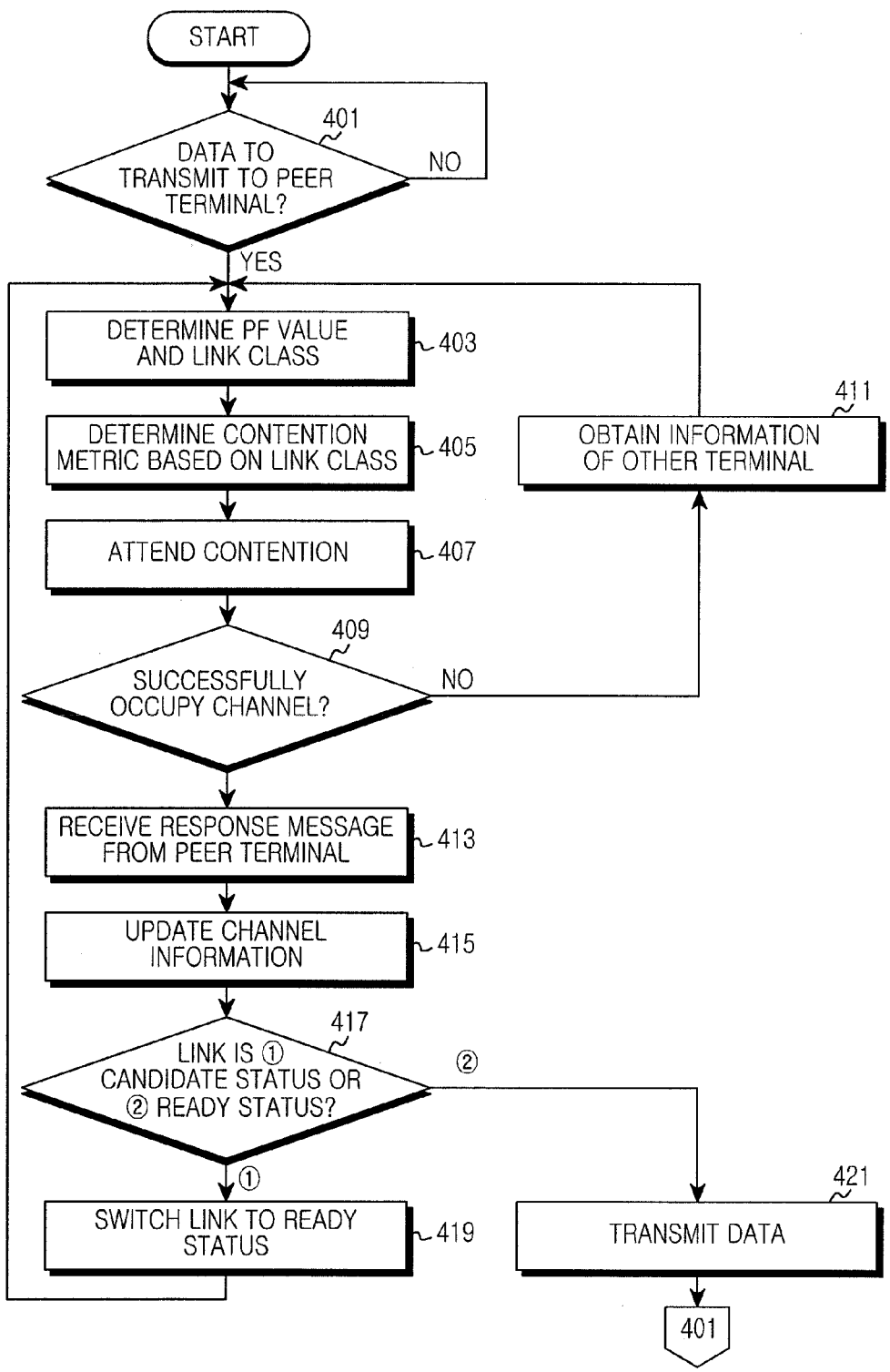
FIG. 4 illustrates operations of a terminal for transmitting data in a wireless communication system according to an exemplary embodiment of the present invention.

Referring to FIG. 4, in step 401, the terminal determines whether data to be transmitted to the peer terminal is generated. The peer terminal is determined based on a destination of the generated data. The generated data is stored to the queue, and the usage of the queue affects the determination of the PF value.

If the terminal determines that data to be transmitted to the peer terminal is not generated at step 401, the terminal may monitor for the generation of data to be transmitted to the peer terminal.

If the terminal determines that data to be transmitted to the peer terminal is generated at step 401, the terminal determines the PF value and the link class in step 403. When the link to the peer terminal is in the candidate status, the terminal determines the link class with the initial value of the candidate status. By contrast, when the link is in the ready status, the terminal determines the link class according to the difference between the PF value of the link previously occupying the channel and the PF value of the link. In so doing, when there is no link previously occupying the channel, the terminal determines the link class with the initial value of the ready status. Herein, to lead the link of the candidate status rapidly into the ready status, the initial value of the link class corresponding to the candidate status can be defined as the highest class and the initial value corresponding to the ready status can be defined as a lower class than the highest class. According to exemplary embodiments of the present invention, the PF value can be determined based on the queue status, the channel quality, the data amount previously transmitted, and the QoS of the traffic.

In step 405, the terminal determines the contention metric by reflecting the determined link class. For example, the terminal determines the contention metric and adjusts the contention metric according to the weight corresponding to the determined link class. For example, when the contention using the backoff offset of FIG. 1 is adopted, the contention metric can be the backoff offset. For example, when the contention using the transmission location of the request message of FIG. 2 is adopted, the contention metric can be the resource location. At this time, the contention metric is adjusted to take the advantageous position in the contention as the link class gets higher.

In step 407, the terminal participates in the contention according to the contention metric. Namely, the terminal generates the request message and tries to send the request message based on the contention according to the contention metric. At this time, when the link to the peer terminal is in the ready status, the terminal includes the PF value in the request message.

In step 409, the terminal determines whether the channel occupation is successful. For example, the terminal determines whether it wins in the contention. For example, when the contention using the backoff offset of FIG. 1 is adopted, the terminal determines the win in the contention when it sends the request message before the other terminals. For example, when the contention using the transmission location of the request message of FIG. 2 is adopted, the terminal determines the win in the contention when it sends the request message over the resource closer to the reference location than the other terminals.

When the terminal determines that the channel occupation fails in step 409, the terminal obtains information of other terminal which occupies the channel in step 411. That is, as failing to occupy the channel, the terminal receives at least one of the request message of the other terminal occupying the channel and the response message of the peer terminal of the other terminal. Hence, the terminal can acquire the information in the request message or the response message of the other terminal, for example, the information such as PF value of the link occupying the channel. Next, the terminal goes back to step 403 to participate in the contention of the next slot.

By contrast, when the terminal determines that the channel occupation is successful in step 409, the terminal receives the response message from the peer terminal in step 413. In so doing, the response message includes the channel information of the link of the peer terminal. For example, the channel information can include at least one of the channel quality and the channel value. When the link is in the ready status, the response message can further include the PF value.

In step 415, the terminal updates the channel information. Next, the terminal initializes the valid period of the channel information. The valid period indicates the time for which the valid channel information is maintained without updating, and reduces by a certain value every time one slot passes. Although it is not illustrated in FIG. 4, when the valid period passes without updating the channel information, the terminal changes the link into the candidate status.

In step 417, the terminal determines whether the current link is in the candidate status or the ready status. For example, the link is ready when the terminal receives the channel information from the peer terminal and the valid period does not expire. By contrast, the link is the candidate when the terminal does not receive the channel information or when the channel information, which is received, is not updated before the valid period expires.

When the link is in the candidate status, the terminal switches the link to the ready status in step 419. Next, the terminal attends the contention in the next slot back in step 403. By contrast, when the link is in the ready status, the terminal transmits data to the peer terminal in step 421. In so doing, the terminal can determine a modulation scheme and a coding rate using the channel information.

Figure 5:
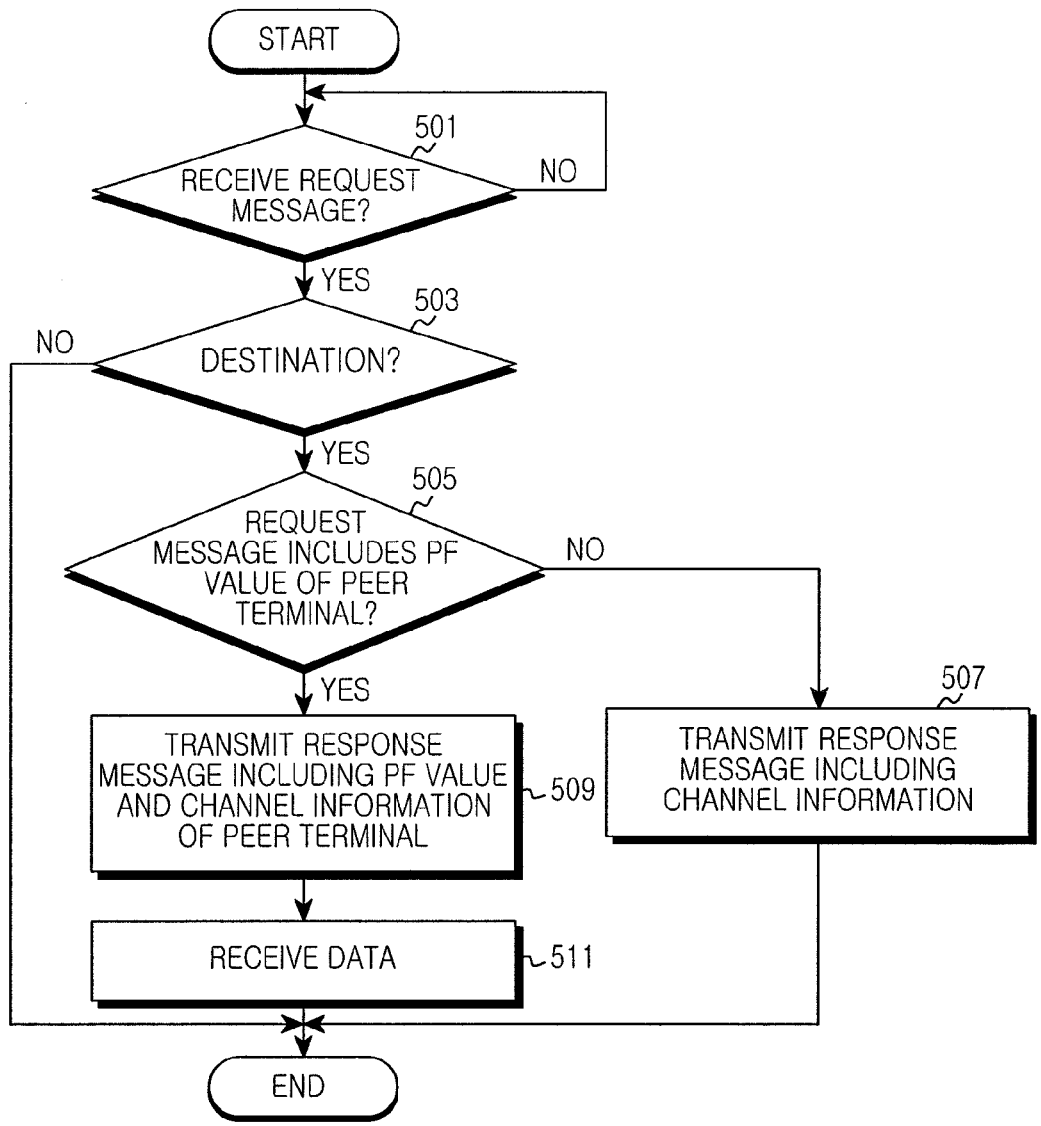
FIG. 5 illustrates operations of a terminal for receiving data in a wireless communication system according to an exemplary embodiment of the present invention.

FIG. 5 illustrates operations of a terminal for receiving data in a wireless communication system according to an exemplary embodiment of the present invention.

Referring to FIG. 5, the terminal determines whether a request message is received in step 501. Herein, the request message can include the PF value of the terminal which transmits the request message.

If the terminal determines that the request message has not been received at step 501, the terminal may monitor for the receipt of the request message.

Upon receiving the request message, the terminal determines whether the terminal itself is the destination of the request message in step 503. When the destination of the request message is another terminal, the terminal is not the peer terminal of the terminal sending the request message. In this case, the terminal finishes this process.

By contrast, when the terminal itself is the destination of the request message, the terminal determines whether the request message includes the PF value of the peer terminal in step 505. For example, the PF value is included when the link of the peer terminal is in the ready status. According to exemplary embodiments of the present invention, the presence of the PF value indicates that the link is ready, and the absence of the PF value indicates that the link is the candidate.

When the PF value is not included in the request message, the terminal sends the response message including the channel information of the peer terminal in step 507. For example, the channel information can include at least one of the channel quality and the channel value. That is, the terminal transmits the necessary channel information to switch the link to the ready status.

By contrast, when the PF value is included in the request message, the terminal sends the response message including the channel information and the PF value of the peer terminal in step 509. For example, the terminal includes the channel information to the response message so as to update the channel status of the link. The terminal also includes the PF value to the response message to inform the neighboring terminals of the PF value of the link occupying the current channel.

In step 511, the terminal receives data from the peer terminal. In so doing, the terminal can determine the modulation scheme and the coding rate using the channel information.

Figure 6:
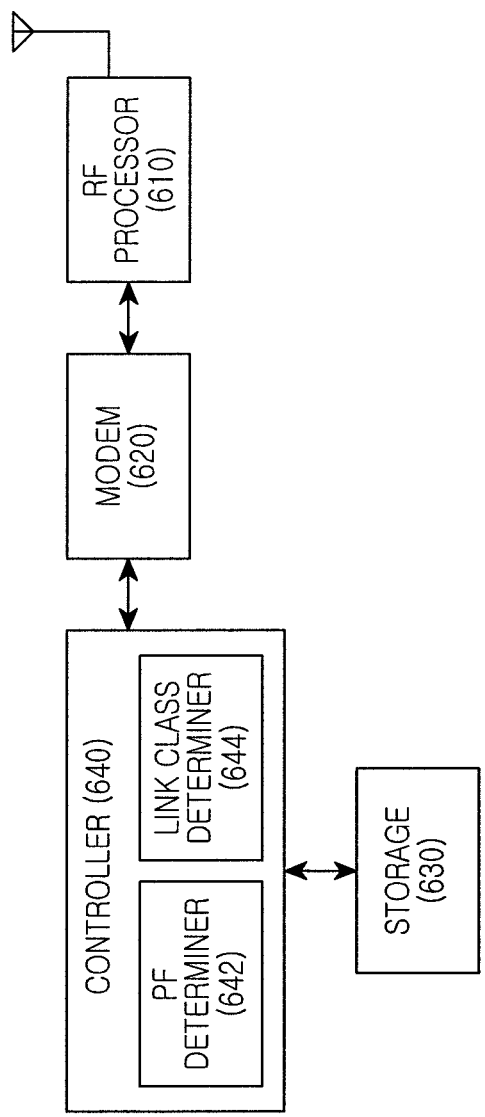
FIG. 6 illustrates a terminal in a wireless communication system according to an exemplary embodiment of the present invention.

FIG. 6 is a block diagram of a terminal in a wireless communication system according to an exemplary embodiment of the present invention.

Referring to FIG. 6, the terminal includes a Radio Frequency (RF) processor 610, a modem 620, a storage 630, and a controller 640.

The RF processor 610 performs functions, such as signal band conversion and amplification, to transmit and receive signals over a radio channel. For example, the RF processor 610 up-converts a baseband signal output from the modem 620 to an RF signal, transmits the RF signal over an antenna, and down-converts the RF signal received over the antenna to the baseband signal. For example, the RF processor 610 can include an amplifier, a mixer, an oscillator, a Digital to Analog Converter (DAC), an Analog to Digital Converter (ADC), and the like.

The modem 620 converts the baseband signal and a bit string according to a physical layer standard of the system. For example, based on Orthogonal Frequency Division Multiplexing (OFDM), to transmit data, the modem 620 generates complex symbols by encoding and modulating the transmit bit string, maps the complex symbols to subcarriers, and constitutes OFDM symbols by applying Inverse Fast Fourier Transform (IFFT) and inserting a Cyclic Prefix (CP). When receiving data, the modem 620 splits the baseband signal output from the RF processor 610 to OFDM symbols, restores the signals mapped to the subcarriers using FFT, and restores the receive bit string by decoding and demodulating the signals.

The storage 630 stores a basic program for operating the terminal, system information, user data, setup information, and QoS classification information. In particular, the storage 630 stores information defining the link classes and the weights corresponding to the link classes. The storage 630 provides the stored data according to a request of the controller 640.

The controller 640 controls the functions of the terminal. For example, the controller 640 generates and provides a transmit packet to the modem 620, and analyzes a receive packet fed from the modem 620. In particular, the controller 640 functions to occupy the channel according to the distributed scheduling. According to exemplary embodiments of the present invention, the controller may include a PF determiner 642 and a link class determiner 644. A PF determiner 642 of the controller 640 determines the PF value. For example, the PF value can be determined based on the queue status, the channel status, the data amount previously transmitted, and the QoS of the traffic. A link class determiner 644 of the controller 640 determines the link class using the PF value of the link of the terminal. For example, when the link is in the candidate status, the link class determiner 644 determines the link class with the initial value of the candidate status. By contrast, when the link is in the ready status, the link class determiner 644 determines the link class according to the difference between the PF value of the link previously occupying the channel and the current PF value of the link. In so doing, when there is no link previously occupying the channel, the link class determiner 644 determines the link class with the initial value of the ready status. Herein, to lead the link of the candidate status rapidly into the ready status, the initial value of the link class corresponding to the candidate status can be defined as the highest class and the initial value corresponding to the ready status can be defined as a lower class than the highest class. The detailed operations of the controller 640 for occupying the channel according to the distributed scheduling are described.

First, the data transmission of the terminal is explained. When the data to be transmitted to the peer terminal is generated, the controller 640 determines the PF value and the link class, and determines the contention metric by reflecting the link class. In so doing, the contention metric is adjusted to obtain the advantageous position in the contention as the link class gets higher. Next, the controller 640 attends the contention according to the contention metric. When the link to the peer terminal is in the candidate status, the request message for the contention includes the PF value. When failing to occupy the channel, the controller 640 obtains the information of the other terminal from the request message or the response message of the other terminal occupying the channel, and then participates in the contention of the next slot. By contrast, when successfully occupying the channel, the controller 640 receives the response message from the peer terminal, updates the channel information, and then initializes the valid period of the channel information. When the valid period expires without updating the channel information, the controller 640 switches the link to the candidate status. In so doing, when the current link of the terminal is in the candidate status, the controller 640 switches the link to the ready status and attends the contention of the next slot. By contrast, when the link is in the ready status, the controller 640 transmits data to the peer terminal.

The data reception of the terminal is explained. According to exemplary embodiments of the present invention, upon receiving the request message destined for the terminal, the controller 640 determines whether the request message includes the PF value of the peer terminal The PF value is included when the link of the peer terminal is in the ready status. When the PF value is not included, the controller 640 sends the response message including the channel information of the peer terminal By contrast, when the PF value is included, the controller 640 sends the response message including the channel information of the peer terminal and the PF value, and receives the data from the peer terminal It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Because the distributed scheduling is fulfilled by simultaneously ensuring the fairness and considering the system throughput in the wireless communication system, the effective scheduling can be supported even in the wireless communication network having no infrastructure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a terminal for transmitting data according to distributed scheduling in a wireless communication system, the method comprising:
   determining a Proportional Fairness (PF) value;
   determining a link class of a link to a peer terminal using the PF value;
   determining a variable which is used to determine whether the terminal wins or loses a contention according to the link class; and
   transmitting a request message requesting channel occupation based on the contention according to the variable.

2. The method of claim 1, wherein the determining of the variable which is used to determine whether the terminal wins or loses the contention according to the link class comprises:

adjusting the variable so as to put the terminal in an advantageous position in the contention as a link class becomes higher.

3. The method of claim 2, wherein the variable which is used to determine whether the terminal wins or loses the contention is one of a backoff offset and a transmission location of the request message.

4. The method of claim 3, wherein the determining of the variable which is used to determine whether the terminal wins or loses the contention according to the link class comprises:
adding a smaller weight to the backoff offset as the link class becomes higher.

5. The method of claim 3, wherein the determining of the variable which is used to determine whether the terminal wins or loses the contention according to the link class comprises:
determining the transmission location to be closer to a reference location as the link class becomes higher.

6. The method of claim 1, wherein the determining of the link class using the PF value comprises:
determining a difference value between the PF value and a PF value of a link previously occupying the channel; and
selecting a link class corresponding to the difference value.

7. The method of claim 1, wherein the determining of the link class using the PF value comprises:
when the link to the peer terminal is in a candidate status, determining the link class with an initial value of the candidate status, and
wherein the link status is in a candidate status when channel information of the link to the peer node is not obtained.

8. The method of claim 1, further comprising:
when the terminal wins the contention, receiving a response message comprising channel information from the peer node.

9. The method of claim 8, further comprising:
determining a link status of the peer terminal,
wherein the link status is one of a candidate status when the channel information of the link to the peer node is not obtained, and a ready status when the channel information of the link to the peer node is obtained.

10. The method of claim 9, wherein the determining of the link status of the peer terminal comprises:
when having the channel information received from the peer terminal, setting the link to a candidate status; and
when one of not having the channel information and having the channel information which is not updated during a valid period, setting the link in the candidate status.

11. The method of claim 1, wherein the transmitting of the request message comprises:
when the link to the peer terminal is in a ready status, transmitting the request message comprising the PF value.

12. The method of claim 1, further comprising:
when the terminal loses the contention, obtaining a PF value of a link occupying the channel using a message transmitted by another terminal.

13. A method for an operation of a terminal for receiving data according to distributed scheduling in a wireless communication system, the method comprising:
receiving a request message requesting channel occupation from a peer terminal;
when the request message comprises a Proportional Fairness (PF) value of the peer terminal, transmitting a response message comprising the PF value and channel information of the peer terminal; and
when the request message does not comprise the PF value of the peer terminal, transmitting a response message comprising the channel information of the peer terminal.

14. The method of claim 13, further comprising:
after transmitting the response message comprising the PF value and the channel information of the peer terminal, receiving data from the peer terminal.

15. An apparatus of a terminal for transmitting data according to distributed scheduling in a wireless communication system, the apparatus comprising:
a controller configured to determine a Proportional Fairness (PF) value, determine a link class of a link to a peer terminal using the PF value, and determine a variable which is used to determine whether the terminal wins or loses a contention according to the link class; and
a modem configured to transmit the request message requesting channel occupation based on the contention according to the variable.

16. The apparatus of claim 15, wherein the controller further configured to adjust the variable so as to put the terminal in an advantageous position in the contention as a link class becomes higher.

17. The apparatus of claim 16, wherein the variable which is used to determine whether the terminal wins or loses the contention is one of a backoff offset and a transmission location of the request message.

18. The apparatus of claim 17, wherein the controller further configured to add a smaller weight to the backoff offset as the link class becomes higher.

19. The apparatus of claim 17, wherein the controller further configured to determine the transmission location to be closer to a reference location as the link class becomes higher.

20. The apparatus of claim 15, wherein, to determine the link class using the PF value, the controller further configured to determine a difference value between the PF value and a PF value of a link previously occupying the channel, and selects a link class corresponding to the difference value.

21. The apparatus of claim 15, wherein, when the link to the peer terminal is in a candidate status, the controller determines the link class with an initial value of the candidate status, and
wherein the link status is in a candidate status when channel information of the link to the peer terminal is not obtained.

22. The apparatus of claim 15, wherein, when the terminal wins the contention, the modem further configured to receive a response message comprising channel information from the peer node.

23. The apparatus of claim 22, wherein the controller further configured to determine a link status of the peer terminal, and
the link status is one of a candidate status when the channel information of the link to the peer node is not obtained, and a ready status when the channel information of the link to the peer node is obtained.

24. The apparatus of claim 23, wherein, when having the channel information received from the peer terminal, the controller sets the link to a candidate status, and
when one of not having the channel information and having the channel information which is not updated during a valid period, the controller further configured to set the link in the candidate status.

25. The apparatus of claim 15, wherein, when the link to the peer terminal is in a ready status, the controller further configured to control to transmit the request message comprising the PF value.

26. The apparatus of claim 15, wherein, when the terminal loses the contention, the controller further configured to obtain a PF value of a link occupying the channel using a message transmitted by another terminal.

27. An apparatus of a terminal for receiving data according to distributed scheduling in a wireless communication system, the apparatus comprising:
- a modem configured to receive a request message requesting channel occupation from a peer terminal, and transmit a response message corresponding to the request message; and
- a controller configured to, when the request message comprises a Proportional Fairness (PF) value of the peer terminal, generate a response message comprising the PF value and channel information of the peer terminal, and when the request message does not comprise the PF value of the peer terminal, generate a response message comprising the channel information of the peer terminal.

28. The apparatus of claim 27, wherein the modem is configured such that after transmitting the response message comprising the PF value and the channel information of the peer terminal, the modem further configured to receive data from the peer terminal.

* * * * *